(12) United States Patent
Currier

(10) Patent No.: US 12,010,957 B2
(45) Date of Patent: Jun. 18, 2024

(54) PORTABLE ELECTRIC ROTARY TRIMMING TOOL

(71) Applicant: Mark Currier, Clearlake Oaks, CA (US)

(72) Inventor: Mark Currier, Clearlake Oaks, CA (US)

( * ) Notice: Subject to any disclaimer, the term of this patent is extended or adjusted under 35 U.S.C. 154(b) by 0 days.

(21) Appl. No.: 17/349,789

(22) Filed: Jun. 16, 2021

(65) Prior Publication Data

US 2021/0386022 A1    Dec. 16, 2021

Related U.S. Application Data

(60) Provisional application No. 63/039,860, filed on Jun. 16, 2020.

(51) Int. Cl.
*A01G 3/053* (2006.01)
*A01G 3/06* (2006.01)

(52) U.S. Cl.
CPC .......... *A01G 3/0535* (2013.01); *A01G 3/062* (2013.01)

(58) Field of Classification Search
CPC ........ A01G 3/0535; A01G 3/062; A01G 3/04; A01G 3/047; A01G 3/053; A01G 3/06; A01G 3/08; A01G 3/085; A01G 3/088
USPC .......................................... 30/276, 151, 164
See application file for complete search history.

(56) References Cited

U.S. PATENT DOCUMENTS

| | | | | |
|---|---|---|---|---|
| 5,644,844 A * | 7/1997 | Pink ...................... | A01D 34/90 30/276 |
| 6,006,434 A * | 12/1999 | Templeton ............. | A01D 34/90 30/296.1 |
| 6,260,278 B1 * | 7/2001 | Faher ................... | A01D 34/902 30/276 |
| 7,134,208 B2 * | 11/2006 | Wilkinson ........... | A01D 34/902 D15/18 |
| 7,538,503 B2 * | 5/2009 | Machens ............... | A01D 34/90 318/284 |
| 9,472,992 B2 * | 10/2016 | Shaffer ................. | H02K 7/145 |
| 10,939,612 B2 * | 3/2021 | Lab ....................... | A01D 34/90 |
| 2006/0156552 A1 * | 7/2006 | Schilling ............... | A01D 34/90 30/276 |
| 2013/0031787 A1 * | 2/2013 | Kamiya ............... | A01D 34/828 30/276 |
| 2013/0283622 A1 * | 10/2013 | Eto ....................... | B26B 25/002 30/164 |

* cited by examiner

*Primary Examiner* — Phong H Nguyen
(74) *Attorney, Agent, or Firm* — Michael A. Guth

(57) ABSTRACT

An electrically powered rotary trimmer adapted to trim external portions of an agricultural product or other plant material. The trimmer may include an electric motor which rotates two or more trimming portions. The trimmer may include a handle with a battery. The trimmer may include a trim guard which may be rotatably adjustable. The trimmer may be adapted to plug into an external power source, which may be an external battery or a cellular telephone.

13 Claims, 3 Drawing Sheets

PORTABLE ELECTRIC ROTARY TRIMMING TOOL

CROSS-REFERENCE TO RELATED APPLICATIONS

This application claims priority to U.S. Provisional Patent Application No. 63/039,860 to Currier, filed Jun. 16, 2020, which is hereby incorporated by reference in its entirety.

BACKGROUND

Field of the Invention

The present invention relates to agricultural trimming tools, and more specifically to an electric powered rotary trimming tool.

Description of Related Art

Pruning is an essential garden task that keeps plants healthy and tidy. Tools used for pruning include garden scissors, secateurs, garden knives, hedge shears, and loppers. Garden scissors allow one to make delicate and precise snips to flower stems, for example. Secateurs area also known as pruners, had pruners, and pruning shears. Hedge shears and loppers typically are slightly larger and used for slightly heavier cutting tasks.

In some agricultural applications, flowers, including dried flowers, may have small dried leaves around the flower. It may be desired to remove these dried leaves. Although this may be done with garden scissors, that may be a laborious and time-consuming task.

What is called for is a small, portable, electrically powered handheld trimmer which can trim extraneous material from such dried flowers, and other agricultural products and plant materials.

SUMMARY OF THE INVENTION

An electrically powered rotary trimmer adapted to trim external portions of an agricultural or other plant product. The trimmer may include an electric motor which rotates two or more trimming portions. The trimmer may include a handle with a battery. The trimmer may include a trim guard which may be rotatably adjustable. The trimmer may be adapted to plug into an external power source, which may be an external battery or a cellular telephone.

BRIEF DESCRIPTION OF THE DRAWINGS

FIG. 1 is a view of a portable electric rotary trimming tool according to some embodiments of the present invention.

DETAILED DESCRIPTION

Figure 1:
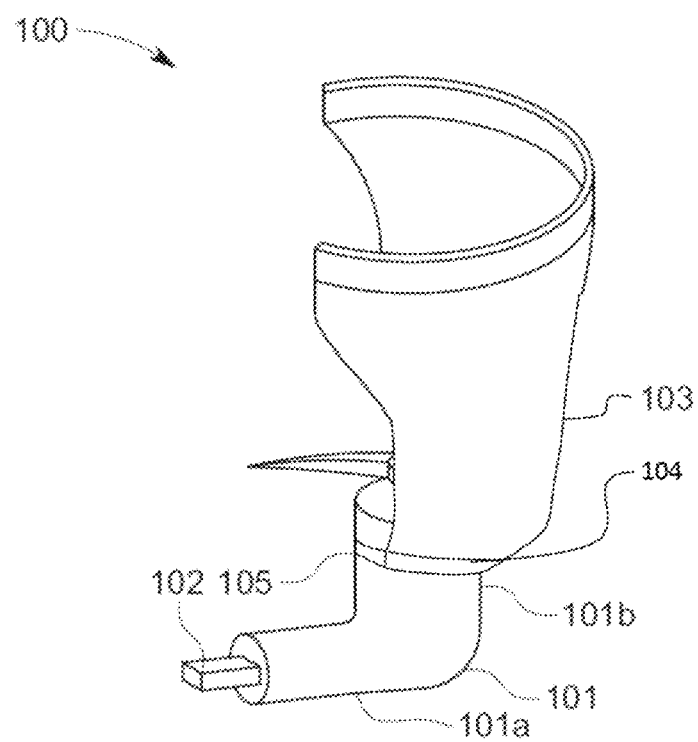
FIG. 1 is a view of a portable electric rotary trimming tool with shroud according to some embodiments of the present invention.
Figure 2:
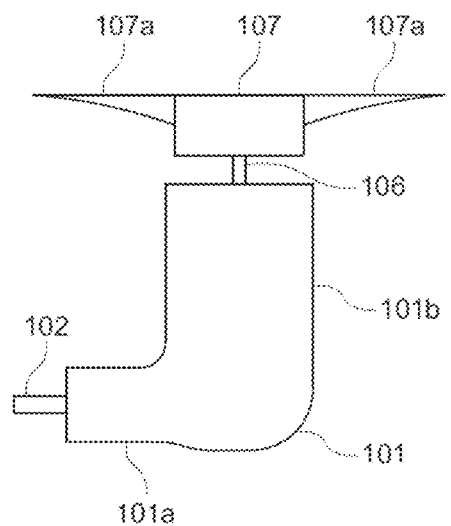

In some embodiments of the present invention, as seen in FIGS. 1 and 2, a portable electric rotary trimming tool 100 utilizes an electric motor to rotate a trimming head 107. A tool body 101 may have a main body portion 101b and a body coupling portion 101a adapted to couple the tool body 101 to a power source, which may be a battery. In some aspects, the main body portion 101b may be offset at a right angle to the body coupling portion 101a. In some aspects, the main body portion 101b may be in line with the body coupling portion 101a. In some aspects, the main body portion 101b may be offset at a different angle to the body coupling portion 101a. A power coupling 102 may extend from the body coupling portion 101a. In some aspects, the power coupling 102 may be of a standard interface for coupling to a cellular telephone, or to another power source.

Power provided to the portable electric rotary trimming tool may be routed through the power coupling 102 and to an electric motor residing within the main body portion 101b. In some aspects, the electric motor is a dc brush motor. The motor shaft 106 may extend out from the main body portion 101b and be coupled to a trimming head 107. The trimming head 107 is driven in a rotary fashion by the electric motor. The trimming head 107 may have flexible trimmer extensions 107a which are rigid enough to trim leaves and other lighter aspects of an agricultural product, or other plant product, while being flexible. A trimmer shroud 103 is coupled to the main body portion 101b of the tool body 101. The shroud is adapted to deflect trimmed portions of the agricultural product, in order, for example, to direct the trim waste in a direction, which may be a direction away from the user. The trimmer shroud 103 may be of a modified conical shape, although with an enlarged lower portion to allow clearance to the rotating trimmer extensions. The trimmer shroud 103 may not be axial symmetric but instead be only a partial axially rotated shape such that material ejected during trimming is deflected by the shroud but allowed to be ejected in that direction in which the shroud is not present. In some aspects, the trimmer shroud 103 is rotatably coupled to the main body portion 101b of the tool body 101 along an interface 105. The interface may be adapted to allow for the rotation of the trimmer shroud 103 relative to the tool body 101, while also having enough friction to retain that position once achieved via rotation by hand. The trimmer shroud 104 may have an interface area 104 adapted to mate with the interface 105 of the tool body 101, such as an enlarged lip adapted to press into a mating groove, for example.

Figure 3:
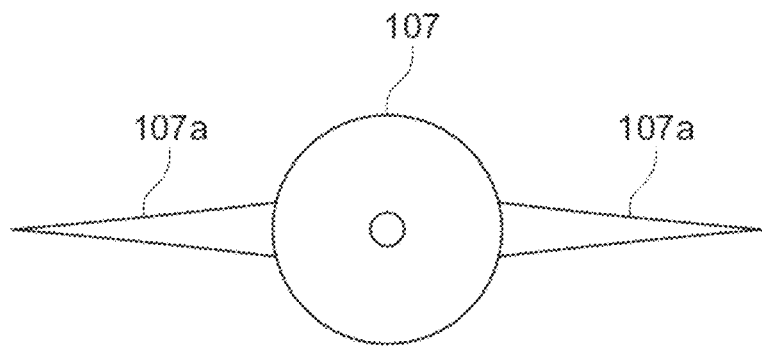
FIG. 3 is a view of a rotary trimming head according to some embodiments of the present invention.
Figure 4:
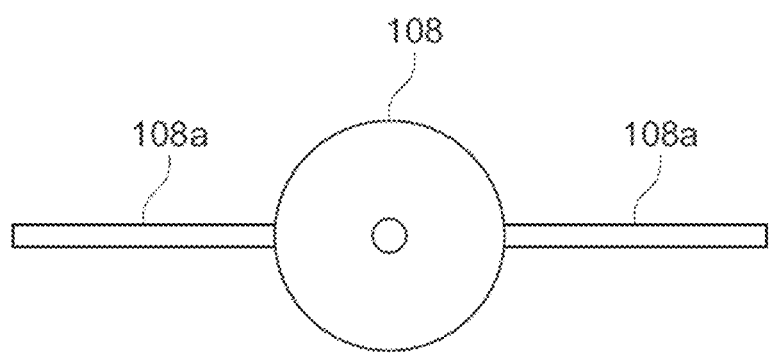
FIG. 4 is a view of rotary trimming head according to some embodiments of the present invention.

FIGS. 3 and 4 illustrate embodiments of trimming heads 107, 108 according to some embodiments of the present invention. A first trimming head 107 may be of a unitary piece with a central hub and trimmer extensions 107a of the same material. A central hole 109 is adapted to mount onto the motor shaft 106. The trimming head 107 fits within the shroud 103 such that the trimmer extensions 107a may rotate without interference, or without sufficient interference that prevents rotation of the trimming head 107. A second trimming head 108 may include flexible trimmer extensions 108a which may be of a different material than the central hub of the trimming head 108. In an exemplary embodiment, the central hub may be of a plastic or rubberized plastic material and the flexible extensions 108a may be of a flexible line, such as a nylon line. The flexible lines may be coupled to the hub from recesses on the underside of the hub and through holes on the outer periphery of the hub.

Figure 5:
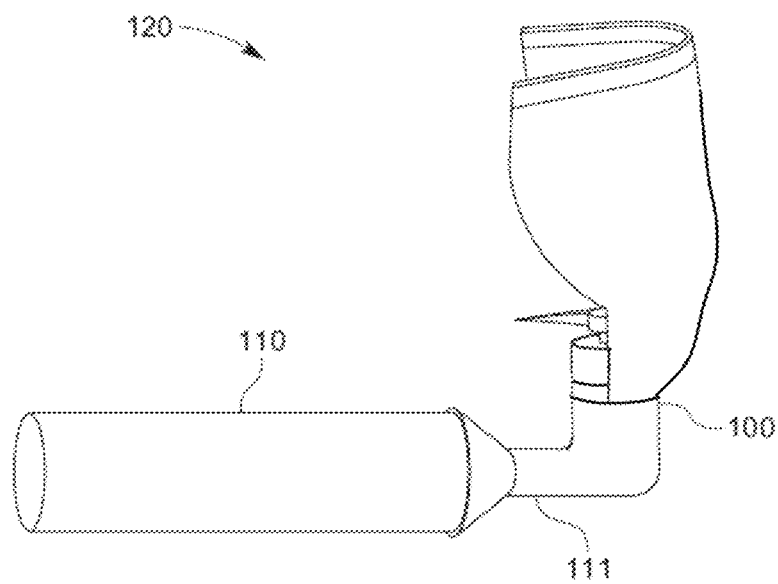
FIG. 5 is a view of a portable electric rotary trimming tool with shroud with hand grip according to some embodiments of the present invention.

In some embodiments of the present invention, as seen in FIG. 5, a portable electric rotary trimming tool system 120 may include a portable electric rotary trimming tool 100 and a handle 110. The handle 110 may include a battery within it to provide power to the portable electric rotary trimming tool via a coupler 111. In some aspects, the handle 110 and the portable electric rotary trimming tool 100 may be detachable. The handle 110 may have a connector, or port, adapted to allow for the coupling of a charging cord which can recharge the battery within the handle 110.

Figure 6:
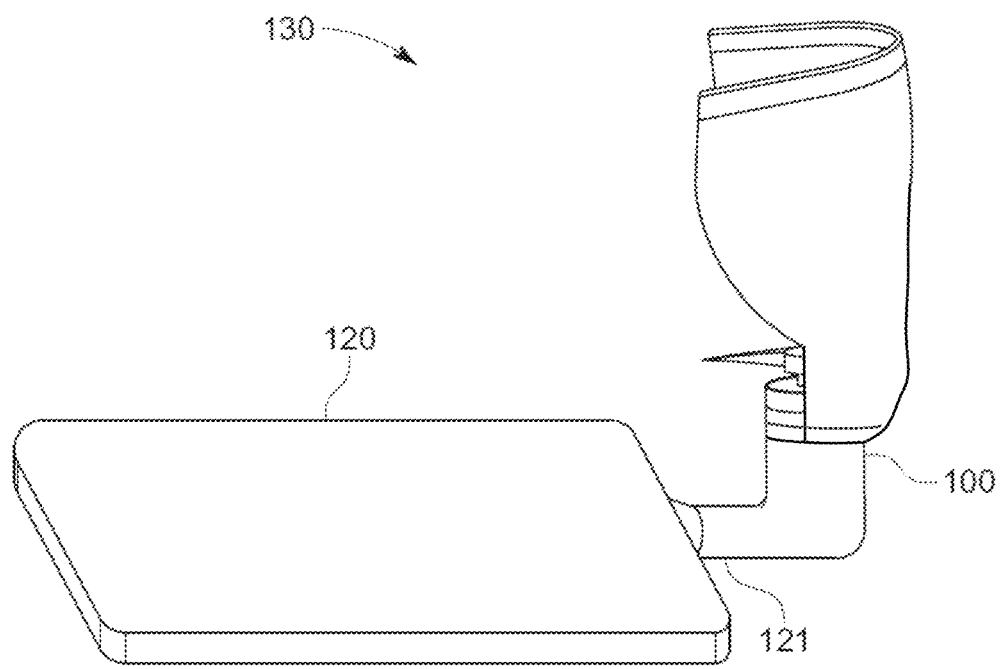
FIG. 6 is a view of a portable electric rotary trimming tool with shroud with cellular telephone according to some embodiments of the present invention.

In some embodiments of the present invention, as seen in FIG. 6, a portable electric rotary trimming tool system 130 may include a portable electric rotary trimming tool 100 and a cellular telephone 120. The cellular telephone 120 may include a battery within it to provide power to the portable electric rotary trimming tool via a coupler 121. In some aspects, the cellular telephone 120 and the portable electric rotary trimming tool 100 may be detachable. The cellular telephone 120 may have a connector, or port, adapted to allow for the coupling of a charging cord which can recharge the battery within the cellular telephone 120.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A handheld electrically powered trimmer, said trimmer comprising:
   a tool body, said tool body comprising:
      a main body portion, said main body portion comprising an electric motor, said electric motor comprising a shaft extending from said main body portion, said shaft defining a motor axis, wherein the length of said main body portion along said motor axis is longer than the radial distance from the motor axis to a furthest part of the main body from said motor axis; and
      a coupling body portion, said coupling body portion comprising a protruding electrical coupler, said electrical coupler adapted to couple to a power source, said coupling body portion offset at an angle to said main body portion;
   a trimming head, said trimming head coupled to said shaft extending from said main body portion, said trimming head adapted to be rotatably driven by said motor around said motor axis, said trimming head comprising a plurality of trimmer extensions extending radially outward from said trimming head; and
   a shroud, said shroud coupled to said main body portion, said shroud adapted to deflect trimmed material trimmed by said trimmer extensions, wherein said trimmer extensions reside in said shroud when in an operating configuration,
   wherein the length of said main body portion of said tool body portion is longer than the length of said coupling body portion.

2. The handheld electrically powered trimmer of claim 1 wherein said coupling body portion is offset at a right angle to said main body portion.

3. The handheld electrically powered trimmer of claim 2 wherein said trimmer extensions extend radially outward further than the radial extension of said coupling body portion from said main body portion.

4. The handheld electrically powered trimmer of claim 1 wherein said shroud is rotatably coupled to said main body portion.

5. The handheld electrically powered trimmer of claim 4 wherein said shroud extends from main body portion with a void along an area through which trimmings are able to be ejected.

6. The handheld electrically powered trimmer of claim 5 wherein said trimmer extensions are of a unitary construction with said trimmer head and of the same material.

7. The handheld electrically powered trimmer of claim 5 wherein said trimmer extensions are of a more flexible material than said trimmer head.

8. The handheld electrically powered trimmer of claim 1 wherein said shroud extends from main body portion with a void along an area through which trimmings are able to be ejected.

9. The handheld electrically powered trimmer of claim 1 wherein said trimmer extensions are of a unitary construction with said trimmer head and of the same material.

10. The handheld electrically powered trimmer of claim 1 wherein said trimmer extensions are of a more flexible material than said trimmer head.

11. The handheld electrically powered trimmer of claim 1 wherein said coupling body portion is offset at a right angle to said main body portion.

12. The handheld electrically powered trimmer of claim 11 wherein said trimmer extensions extend radially outward further than the radial distance from said motor axis to the furthest radial extension of said coupling body portion from said main body portion.

13. The handheld electrically powered trimmer of claim 1 further comprising a handle, said handle removably coupled to said electrical coupler of said coupling body portion.

* * * * *